(12) United States Patent
Kim et al.

(10) Patent No.: US 11,082,545 B2
(45) Date of Patent: *Aug. 3, 2021

(54) ELECTRONIC DEVICE WITH RESIN INTEGRATED HOUSING

(71) Applicant: Samsung Electronics Co., Ltd., Gyeonggi-do (KR)

(72) Inventors: Seong-Hyeon Kim, Gyeongsangbuk-do (KR); Hyo-Sung Kang, Gyeongsangbuk-do (KR); Min-Yong Kim, Gyeongsangbuk-do (KR); Hyun-Young Roh, Daegu (KR); Jung-Bae Park, Daegu (KR); Tae-Young Bae, Gyeongsangbuk-do (KR); Hyo-Won Seo, Gyeongsangbuk-do (KR); Hae-Won Sung, Gyeongsangbuk-do (KR); Gyung-Hoon Lee, Gyeongsangbuk-do (KR); Bit-Na Kim, Gyeongsangnam-do (KR); Byung-Joon Lee, Daegu (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/020,291

(22) Filed: Sep. 14, 2020

(65) Prior Publication Data

US 2020/0412851 A1 Dec. 31, 2020

Related U.S. Application Data

(63) Continuation of application No. 16/057,048, filed on Aug. 7, 2018, now Pat. No. 10,778,819, which is a
(Continued)

(30) Foreign Application Priority Data

Oct. 10, 2016 (KR) ........................ 10-2016-0130918

(51) Int. Cl.
*H04M 1/02* (2006.01)
*G06F 1/16* (2006.01)
*H04M 1/18* (2006.01)

(52) U.S. Cl.
CPC ........ *H04M 1/0249* (2013.01); *G06F 1/1637* (2013.01); *G06F 1/1656* (2013.01); *H04M 1/0266* (2013.01); *H04M 1/185* (2013.01)

(58) Field of Classification Search
CPC combination set(s) only.
See application file for complete search history.

(56) References Cited

U.S. PATENT DOCUMENTS 8,320,978 B2 * 11/2012 Chang et al. .............. 455/575.1
8,561,831 B2 10/2013 Liao
(Continued)

FOREIGN PATENT DOCUMENTS

CN 101998780 3/2011
CN 203445915 2/2014
(Continued)

OTHER PUBLICATIONS

European Search Report dated Mar. 1, 2019 issued in counterpart application No. 17859833.0-1216, 7 pages.
(Continued)

*Primary Examiner* — Meless N Zewdu
(74) *Attorney, Agent, or Firm* — The Farrell Law Firm, P.C.

(57) ABSTRACT

Provided is an electronic device that includes a housing at least partially including a metal portion, a glass plate mounted on one surface of the housing, and a buffer disposed at least on the metal portion on one face of the housing and disposed adjacent to an edge of the glass plate.

20 Claims, 11 Drawing Sheets

Related U.S. Application Data continuation of application No. PCT/KR2017/010491, filed on Sep. 22, 2017.

(56) References Cited

U.S. PATENT DOCUMENTS

| | | | |
|---|---|---|---|
| 9,185,816 B2* | 11/2015 | Pakula etal. | H05K 5/03 |
| 9,614,940 B2 | 4/2017 | Huang et al. | |
| 9,699,279 B2 | 7/2017 | Lee et al. | |
| 9,750,322 B2 | 9/2017 | Nazzaro et al. | |
| 9,791,893 B2* | 10/2017 | Yamaguchi et al. | G06F 1/1656 |
| 9,991,584 B2 | 6/2018 | Montevirgen et al. | |
| 10,129,989 B2 | 11/2018 | Kim et al. | |
| 10,187,732 B2* | 1/2019 | Watanbe | H04R 17/00 |
| 10,613,362 B2* | 4/2020 | Hirakata | G02F 1/133308 |
| 10,778,819 B2* | 9/2020 | Kim etal. | H04M 1/0249 |
| 2011/0048627 A1* | 3/2011 | Chang etal. | 156/245 |
| 2011/0049139 A1* | 3/2011 | Jiang et al. | 220/4.01 |
| 2012/0114901 A1 | 5/2012 | Uraji et al. | |
| 2012/0170180 A1 | 7/2012 | Chen et al. | |
| 2013/0082883 A1 | 4/2013 | Montevirgen et al. | |
| 2014/0111927 A1 | 4/2014 | Raff | |
| 2014/0193606 A1* | 7/2014 | Kwong | B32B 7/02 |
| 2014/0370244 A1 | 12/2014 | Kinoshita | |
| 2015/0155614 A1 | 6/2015 | Youn et al. | |
| 2016/0151993 A1* | 6/2016 | Ikeda et al. | B32B 3/263 |
| 2016/0209871 A1 | 7/2016 | Dabov et al. | |
| 2019/0094906 A1 | 3/2019 | Choi et al. | |
| 2020/0073445 A1 | 3/2020 | Kuna et al. | |

FOREIGN PATENT DOCUMENTS

| | | |
|---|---|---|
| CN | 203535596 | 4/2014 |
| CN | 103974570 | 8/2014 |
| CN | 105892570 | 8/2016 |
| EP | 2 993 872 | 3/2016 |
| EP | 3 054 655 | 8/2016 |
| JP | 11-122330 | 4/1999 |
| KR | 1020070013127 | 1/2007 |
| KR | 1020090106944 | 10/2009 |
| KR | 1020120029960 | 3/2012 |
| KR | 1020130081513 | 7/2013 |
| KR | 1020130085218 | 7/2013 |
| KR | 1020160097106 | 8/2016 |
| WO | WO 2015/005598 | 1/2015 |

OTHER PUBLICATIONS

PCT/ISA/210 Search Report dated Jan. 11, 2018 issued on PCT/KR2017/010491 pp. 3.
PCT/ISA/237 Written Opinion dated Jan. 11, 2018 issued on PCT/KR2017/010491 pp. 6.
Chinese Office Action dated Jan. 6, 2020 issued in counterpart application No. 201780012367.7, 25 pages.
European Search Report dated Jun. 19, 2020 issued in counterpart application No. 20169200.1-1216, 7 pages.
Korean Office Action dated Nov. 2, 2020 issued in counterpart application No. 10-2016-0130918, 12 pages.
Chinese Office Action dated Dec. 7, 2020 issued in counterpart application No. 201780012367.7, 26 pages.

* cited by examiner

ELECTRONIC DEVICE WITH RESIN INTEGRATED HOUSING

PRIORITY

This application is a continuation of U.S. patent application Ser. No. 16/057,048, filed with the U.S. Patent and Trademark Office on Aug. 7, 2018, as a continuation of International Application No. PCT/KR2017/010491 filed on Sep. 22, 2017, which is based on and claims priority to Korean Application No. 10-2016-0130918 filed on Oct. 10, 2016, the entire content of each of which are incorporated herein by reference.

BACKGROUND

1. Field

The present disclosure relates to an electronic device, for example, an electronic device that includes a combination of a glass material portion and a metallic material portion, and a manufacturing method thereof.

2. Description of the Related Art

Typically, the term "electronic device" refers to a device that performs a specific function according to a program incorporated therein, e.g., an electronic scheduler, a portable multimedia reproducer, a mobile communication terminal, a tablet personal computer ("PC"), an image/sound device, a desktop/laptop PC, or a vehicular navigation system, and electronic devices include home appliances. For example, the electronic device may output information stored therein as a sound or an image. As the degree of integration of electronic devices has increased, and super-high speed and large-capacity wireless communication has become popular, with various functions recently being provided in a single mobile communication terminal. For example, various functions, such as an entertainment function, e.g., a game function, a multimedia function, e.g., a music/video reproducing function, a communication and security function for mobile banking, a schedule management function, and an e-wallet function, are integrated in a single electronic device, in addition to a communication function.

As electronic devices, such as a mobile communication terminal that is carried and used by an individual user, continue to become more popular, the appearance of the electronic device is diversified and refined. A case or housing made of a metallic material may be utilized so as to diversify the appearance design and texture of the electronic device, and the case or housing may include glass or ceramic material for ornamental effect.

Generally, an electronic device may include a display as an output thereof. The display can be provided as a panel that outputs a screen, and the display panel may be disposed in the housing of the electronic device with the display panel being coupled to window glass, which may be made of tempered glass to ensure scratch resistance or avoid similar damage.

However, when the window glass material is combined with a metallic material housing, the possibility of cracking or breakage of the window glass material due to an external impact may increase. For example, when an external impact or load is applied that brings the metallic material housing into contact with the window glass material, and the external impact/load temporarily or permanently deforms the metallic material housing, the impact/load may crack or break the window glass material.

SUMMARY

The present disclosure has been made to address at least the problems and disadvantages described above, and to provide at least the advantages described below. Accordingly, an aspect of the present disclosure provides an electronic device and a manufacturing method thereof in which a metal housing is utilized so that cracking and breakage of a window glass material can be prevented while diversifying and refining the appearance of the electronic device.

According to an embodiment, a portable communication device is provided that includes a housing and a glass plate forming at least a part of an outer surface of the portable communication device. The housing includes a metal housing member forming a portion of an outer side surface of the portable communication device, the metal housing member including a first metal portion and a second metal portion, a seating groove formed along the metal housing member, and a resin member including a first portion at least partially formed in the seating groove of the metal housing member and a second portion formed between the first metal portion and the second metal portion. The first portion of the resin member is at least partially exposed to an outside of the portable communication device between the metal housing member and the glass plate and the second portion of the resin member is at least partially exposed to the outside of the portable communication device between the first metal portion and the second metal portion. The resin member is configured to form another portion of an outer side surface of the portable communication device between the first metal portion and the second metal portion.

According to an embodiment, a portable communication device is provided that includes a housing, a glass plate and a resin member. The housing includes a metal housing member forming a portion of an outer side surface of the portable communication device, the metal housing member including a first metal portion and a second metal portion, a seating groove formed along the metal housing member, and a resin member including a first portion at least partially formed in the seating groove of the metal housing member and a second portion formed between the first metal portion and the second metal portion, the second portion of the resin member is configured to from an insulating structure between the first metal portion and the second metal portion. The glass plate forms at least a part of an outer surface of the portable communication device. The communication module is electrically connected to at least one of the first metal portion and a second metal portion, and is configured to transmit/receive wireless signals using the at least one of the first metal portion and a second metal portion. The first portion of the resin member is at least partially exposed to an outside of the portable communication device between the metal housing member and the glass plate and the second portion of the resin member is at least partially exposed to the outside of the portable communication device between the first metal portion and the second metal portion.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
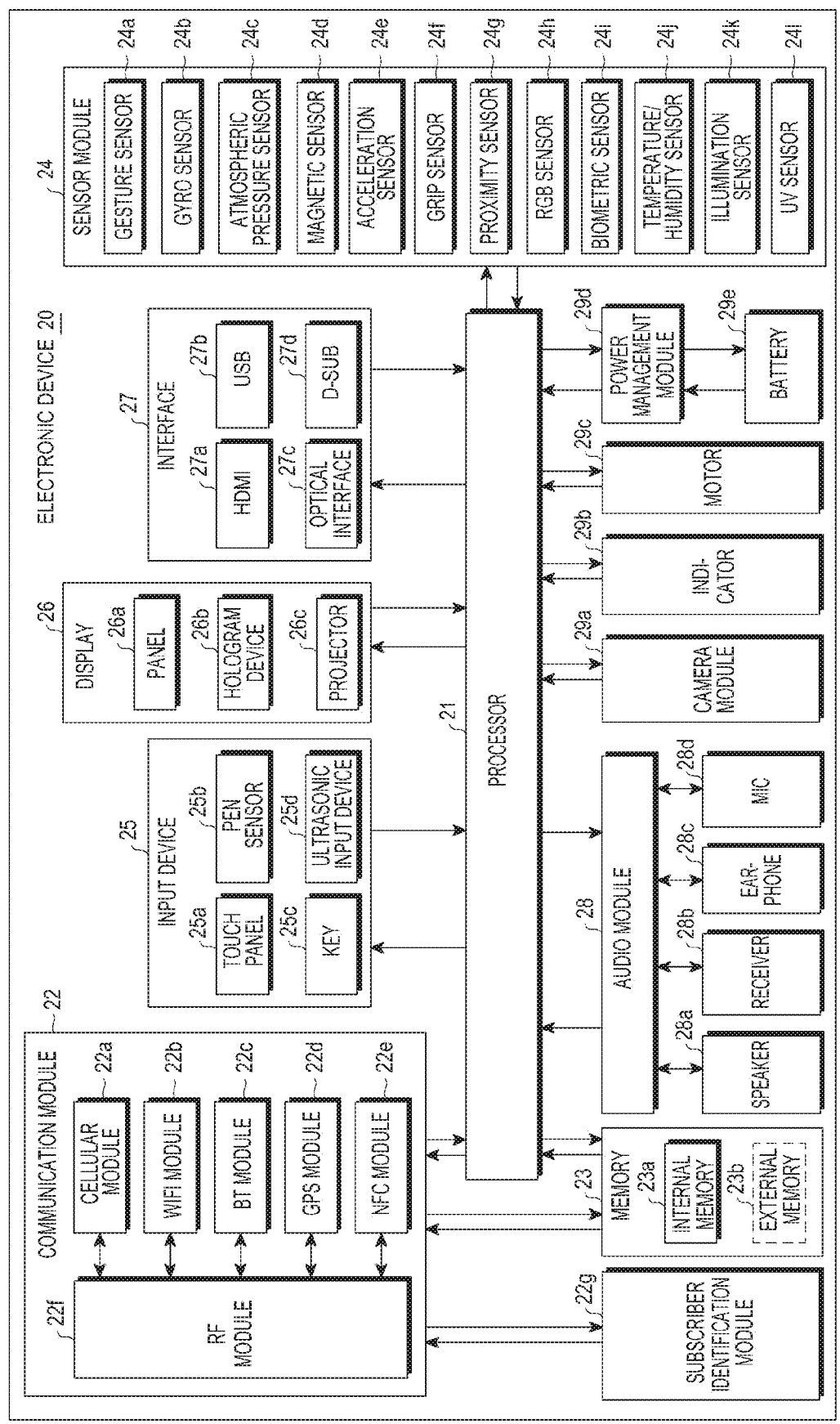
FIG. 1 is a block diagram of an electronic device according to an embodiment of the present disclosure.

As the present disclosure allows for various changes and numerous embodiments, some exemplary embodiments will be described in detail with reference to the accompanying drawings. However, the embodiments do not limit the present disclosure to a specific implementation, but should be construed as including all modifications, equivalents, and replacements included in the spirit and scope of the present disclosure.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order are determined in the mentioned order or arbitrarily and may not be arbitrarily changed if necessary.

In the present disclosure, the terms are merely used to describe a specific embodiment, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined otherwise, all terms used herein, including technical and scientific terms, have the same meaning as commonly understood by those of skill in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in the present disclosure.

In the present disclosure, an electronic device may be a random device, and the electronic device may be called a terminal, a portable terminal, a mobile terminal, a communication terminal, a portable communication terminal, a portable mobile terminal, a touch screen or the like.

For example, the electronic device may be a smartphone, a portable phone, a game player, a TV, a display unit, a heads-up display unit for a vehicle, a notebook computer, a laptop computer, a tablet PC, a personal media player (PMP), a personal digital assistants (PDA), and the like. The electronic device may be implemented as a portable communication terminal which has a wireless communication function and a pocket sized. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless local area network (WLAN), a wide area network (WAN), an Internet, a small area network (SAN) or the like, but is not limited thereto.

FIG. 1 is a block diagram illustrating an electronic device 20 according to an embodiment. The electronic device 20 may include, for example, the whole or a portion of the electronic device 20 illustrated in FIG. 1. The electronic device 20 may include at least one controller or processor (e.g., an application processor AP) 21, a communication module 22, a subscriber identification module 22g, a memory 23, a sensor module 24, an input device 25, a display 26, an interface 27, an audio module 28, a camera module 29a, a power management module 29d, a battery 29e, an indicator 29b, and a motor 29c. The processor 21 may drive, for example, an operating system or an application so as to control a plurality of hardware or software components connected thereto, and may also perform various data processing and arithmetic operations. The processor 21 may be implemented by, for example, a system-on-chip (SoC). The processor 21 may further include a graphic processing unit (GPU) and/or an image signal processor. The processor 21 may include at least some components (e.g., a cellular module 22a) among the components illustrated in FIG. 1. The processor 21 may load a command or data received from at least one of the other components (e.g., a non-volatile memory) in a volatile memory to process the command and data, and may store resultant data in a non-volatile memory.

The communication module 22 may include, for example, the cellular module 22a, a Wi-Fi module 22b, a Bluetooth module 22c, a GNSS module 22d, an NFC module 22e, and a radio frequency (RF) module 22f. The cellular module 22a may provide, for example, a voice call, a video call, a message service, or an internet service through, for example, a communication network. The cellular module 22a may perform discrimination and authentication of the electronic device 20 within the communication network using the subscriber identification module (e.g., a SIM card) 22g. The cellular module 22a may perform at least some of the functions that may be provided by the processor 21. The cellular module 22a may include a communication processor (CP), and at least some (e.g., two or more) of the cellular module 22a, the Wi-Fi module 22b, the Bluetooth module 22c, the GNSS module 22d, and the NFC module 22e may be incorporated in a single integrated chip (IC) or an IC package. The RF module 22f may transmit/receive, for example, a communication signal (e.g., an RF signal). The RF module 22f may include, for example, a transceiver, a power amp module (PAM), a frequency filter, a low noise amplifier (LNA), or an antenna. At least one of the cellular module 22a, the Wi-Fi module 22b, the Bluetooth module 22c, the GNSS module 22d, and the NFC module 22e may transmit/receive an RF signal through one or more separate RF modules. The subscriber identification module 22g may include, for example, a card that includes a subscriber identification module and/or an embedded SIM, and may also include intrinsic identification information (e.g., integrated circuit card IDentifier (ICCID)) or subscriber information (e.g., international mobile subscriber identity (IMSI)).

The memory 23 may include, for example, an internal memory 23a or an external memory 23b. The internal memory 23a may include at least one of, for example, a volatile memory (e.g., a DRAM, an SRAM, or an SDRAM), a non-volatile memory (e.g., a one-time programmable ROM (OTPROM), a PROM, an EPROM, an EEPROM, a mask ROM, a flash ROM, a flash memory, a hard drive, and a solid-state drive (SSD). The external memory 23b may further include a flash drive (e.g., a compact flash (CF), a secure digital (SD), a micro secure digital (micro-SD), a mini secure digital (mini-SD), an extreme digital (xD), a multi-media card (MMC), or a memory stick). The external memory 23b may be functionally or physically connected to the electronic device 20 through any of various interfaces.

The sensor module 24 may measure a physical quantity or may sense an operating status of the electronic device 20, and convert the measured or sensed information into electric signals. The sensor module 24 may include at least one of, for example, a gesture sensor 24a, a gyro sensor 24b, an atmospheric pressure sensor 24c, a magnetic sensor 24d, an acceleration sensor 24e, a grip sensor 24f, a proximity sensor 24g, a color sensor 24h (e.g., RGB (red, green, blue) sensor), a biometric sensor 24i, a temperature/humidity sensor 24j, an illumination sensor 24k, and an ultra-violet (UV) sensor 24l. Additionally, or alternatively, the sensor module 24 may include, for example, an E-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 24 may further include a control circuit for controlling one or more sensors incorporated therein. In a certain embodiment, the electronic device 20 may further include a processor configured to control the sensor module 24 as a portion of the processor 21 or separate from the processor 21 so as to control the sensor module 24 while the processor 21 is in a sleep state.

The input device 25 may include, for example, a touch panel 25a, a (digital) pen sensor 25b, a key 25c, or an ultrasonic input device 25d. As the touch panel 25a, at least one of, for example, a capacitive-type touch panel, a resistive-type touch panel, an infrared-type touch panel, and an ultrasonic-type panel may be used. In addition, the touch panel 25a may further include a control circuit. The touch panel 25a may further include a tactile layer so as to provide a tactile reaction to a user. The (digital) pen sensor 25b may be, for example, a portion of the touch panel, or may include a separate recognition sheet. The key 25c may include, for example, a physical button, an optical key, or a keypad. The ultrasonic input device 25d may sense, through a microphone (e.g., a microphone 28d), ultrasonic waves that are generated by an input tool so as to confirm data corresponding to the sensed ultrasonic waves.

The display 26 may include a panel 26a, a hologram device 26b, a projector 26c, and/or a control circuit for controlling these components. The panel 26a may be implemented to be, for example, flexible, transparent, or wearable. The panel 26a may be constituted with the touch panel 25a and one or more modules. The panel 26a may include a pressure sensor (or a force sensor) that is capable of measuring the intensity of pressure of a user's touch. The pressure sensor may be integrally implemented with the touch panel 25a, or may be implemented by one or more sensors separately from the touch panel 25a. The hologram device 26b may show a stereoscopic image in the air using interference of light. The projector 26c may project light onto a screen so as to display an image. The screen may be located, for example, inside or outside the electronic device 20. The interface 27 may include, for example, an HDMI 27a, a USB 27b, an optical interface 27c, or a D-subminiature (D-sub) interface 27d. The interface 27 may include, for example, a mobile high-definition link (MHL) interface, an SD card/multi-media card (MMC) interface, or an Infrared Data Association (IrDA) standard interface.

The audio module 28 may bi-directionally convert, for example, sound and electric signals. The audio module 28 may process sound information input or output through, for example, a speaker 28a, a receiver 28b, an earphone 28c, or a microphone 28d. The camera module 29a is a device that is capable of taking, for example, a still image and a video image, and the camera module 29a may include at least one image sensor (e.g., a front sensor or a rear sensor), a lens, an image signal processor (ISP), or a flash (e.g., LED or xenon lamp). The power management module 29d may manage, for example, the electric power of the electronic device 20. The power management module 29d may include a power management integrated circuit (PMIC), a charger integrated circuit (IC), or a battery gauge. The PMIC may be configured as a wired and/or wireless charging type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the remaining charge of the battery 29e, and a voltage, a current, or a temperature while charging. The battery 29e may include, for example, a rechargeable battery and/or a solar battery.

The indicator 29b may indicate a specific status of the electronic device 20 or of a part thereof (e.g., the processor 21), such as a booting status, a message status, or a charged status. The motor 29c may convert an electric signal into a mechanical vibration, and may generate, for example, a vibration or a haptic effect. The electronic device 20 may include, for example, a mobile TV support device (e.g., a GPU) that is capable of processing media data according to a standard of, for example, digital multimedia broadcasting (DMB), digital video broadcasting (DVB), or MediaFlo™. Each of the components described herein may be constituted with one or more components, and the names of the corresponding components may vary depending on the type of the electronic device. The electronic device (e.g., the electronic device 20) may not include some of the components, or may include an additional component. Alternatively, some of the components may be combined with each other to be configured as one object, and to perform functions, which are the same as those of the corresponding components prior to the combination.

Figure 2:
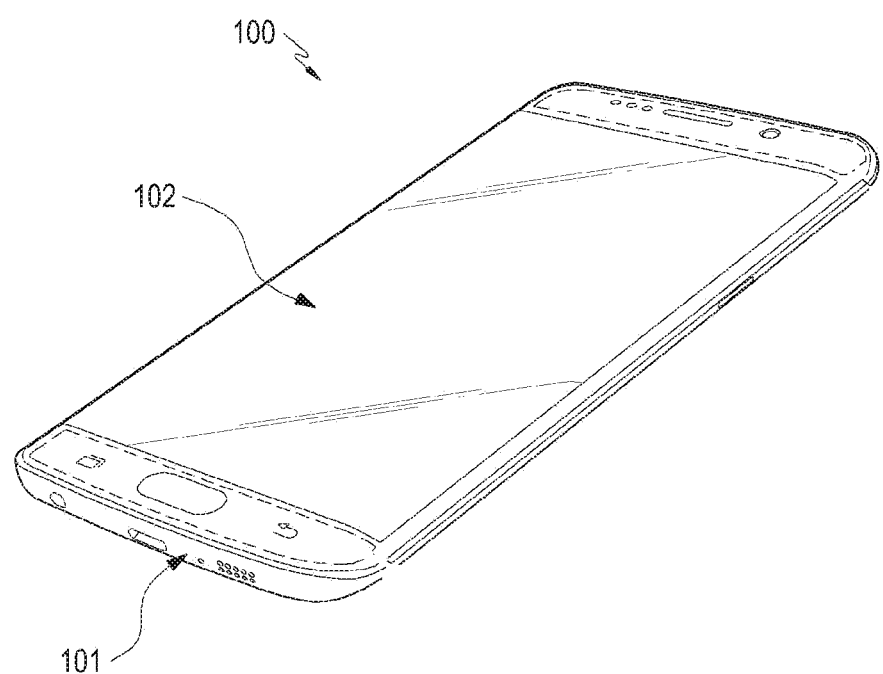
FIG. 2 is a perspective view of an electronic device according to an embodiment of the present disclosure.
Figure 3:
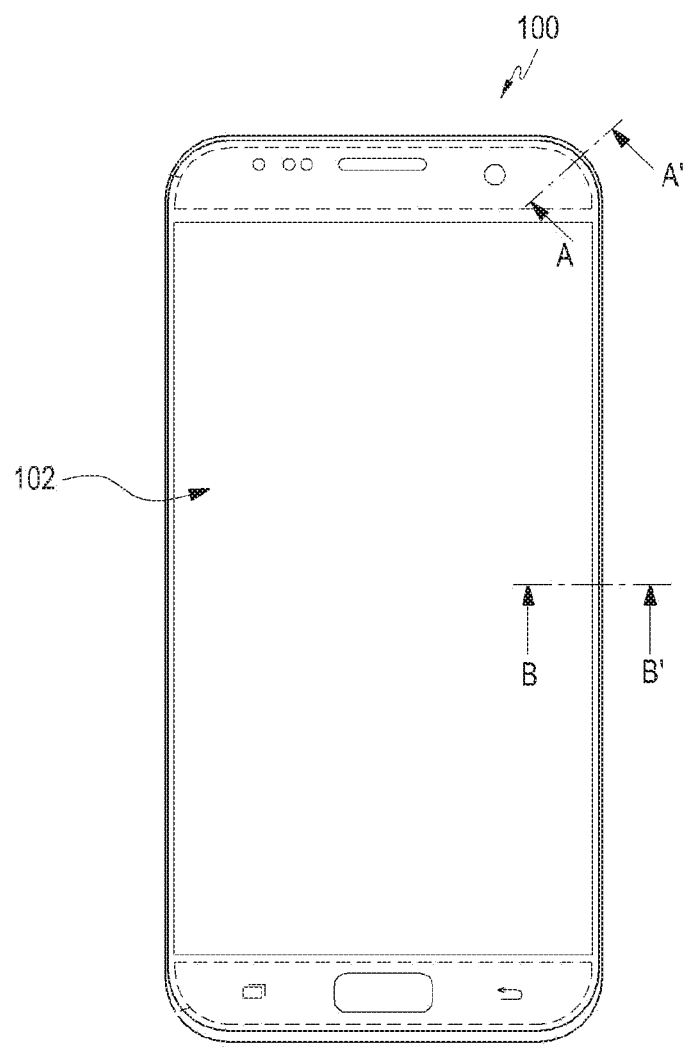
FIG. 3 is a front view of the electronic device of FIG. 2.

FIG. 2 is a perspective view of an electronic device 100 according to an embodiment. FIG. 3 is a front view of the electronic device 100 of FIG. 2.

Referring to FIGS. 2 to 3, the electronic device 100 (e.g., the electronic device 20 in FIG. 1) includes a housing 101 and a glass plate 102 mounted on at least one face of the housing 101.

The housing 101 may accommodate, for example, the electronic components described with reference to FIG. 1, and may at least partially include a metal portion of a metallic material. For example, a part or the entirety of the housing 101 may be made of a metallic material. In some embodiments, some of the metallic material portions of the housing 101 may be utilized as radiation conductors of an antenna device. For example, some of the metallic material portions of the housing 101 may be connected to the communication module 22 of FIG. 1 to transmit/receive wireless signals.

The glass plate 102 may be provided as a part or the entirety of a display device (e.g., the display 26 in FIG. 1) of the electronic device 100. For example, a display panel (e.g., the panel 26a in FIG. 1) may be provided on an inner face 102a of the glass plate 102 to provide an output display screen. A touch panel (e.g., the touch panel 25a in FIG. 1) may be disposed on the glass plate 102, and a touch panel and a display panel may be combined so as to provide a touch screen function. For example, the glass plate 102 may be an output device that at least partially outputs a screen, and may be utilized as an input device that generates an input signal corresponding to a touch input of a user.

An input device such as a button or a touch key (e.g., the key 25c in FIG. 1) may be provided on a lower side 102a of the glass plate 102, and a sound module (e.g., the receiver 28b of FIG. 1) may be provided on the upper side 102b of the glass plate 102. The display panel may be provided to correspond to a region of the lower side 102a of the glass plate 102, and may be combined with a touch panel disposed on the lower side 102a of the glass plate 102 so as to replace a mechanically operated input device, such as a button.

Figure 4:
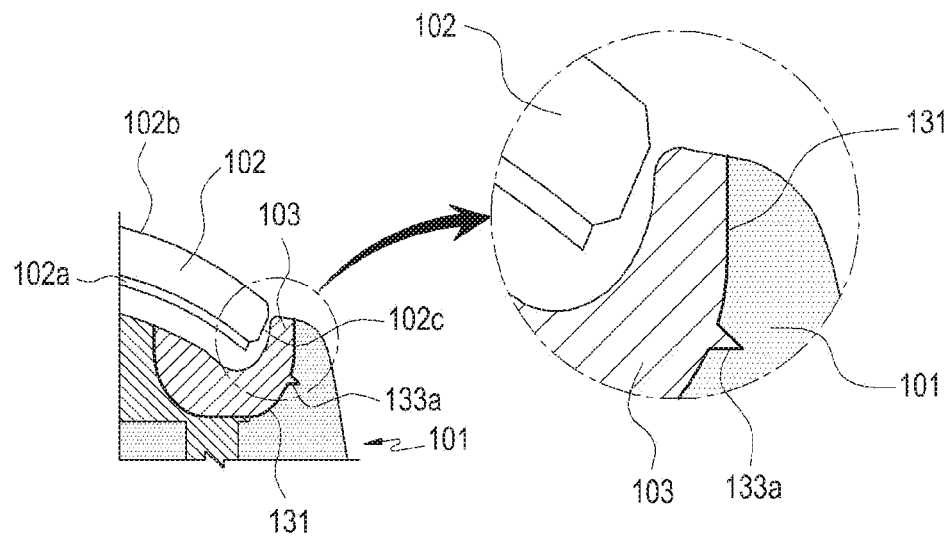
FIG. 4 is a cross-sectional view of the electronic device of FIG. 3.
Figure 5:
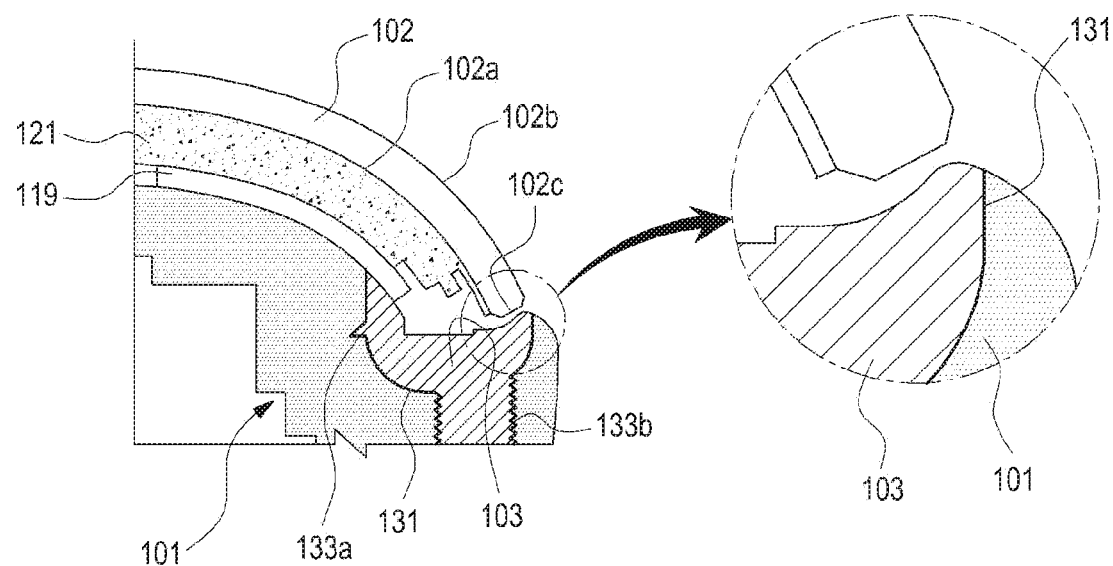
FIG. 5 is another cross-sectional view of the electronic device of FIG. 3.

FIG. 4 is a cross-sectional view of the electronic device of FIG. 2 and FIG. 5 is another cross-sectional view illustrating the electronic device of FIG. 2.

FIG. 4 is a cross-sectional view of the electronic device 100 taken along line A-A' of FIG. 3, and FIG. 5 is a cross-sectional view of another embodiment of the electronic device 100 taken along line B-B' of FIG. 3.

Further referring to FIGS. 4 and 5, the electronic device 100 includes glass plate 102 having inner and outer faces which are formed at least partially in a curved shape, for example, a three-dimensional shape. A display panel 121 is coupled to the inner face 102a of the glass plate 102, which provides a window for viewing of the display panel 121, and the display panel 121 at least partially has a curved shape corresponding to a shape of the inner face of the glass plate 102. An outer face 102b of the glass plate 102 provides a surface of a glass plate having a planar area that covers at least a part of the display panel 121 of the electronic device 100. The glass plate 102 (and/or the display panel 121) may be bonded at least in part to the housing 101 via an adhesive 119 (e.g., double-sided tape). The bonded portion of the housing 101 may be formed as a curved surface corresponding to the curved portion of the glass plate 102 and/or the display panel 121. For example, the adhesive 119 may bond a portion of the glass plate 102 and/or the display panel 121 to a portion of the housing 101.

The electronic device 100 may include a buffer member (herein "buffer") 103. The buffer 103 may be formed of a synthetic, non-conductive resin material, e.g., polycarbonate, and may be formed along a portion of the housing 101 as a molding member. The buffer 103 may be disposed adjacent to an edge area 102c of the glass plate 102, and may be disposed between the glass plate 102 and a metal portion of the housing 101 comprising a metallic material, to reduce an impact or a load applied to the glass plate 102 from transferring to the housing 101. For example, the buffer 103 is disposed adjacent to the edge area 102c of the glass plate 102 while being disposed on at least the portion the metal portion of the housing 101 that includes a metallic material. The buffer 103 is disposed at least on the metal portion on one face of the housing, and is disposed adjacent to the edge area 102c of the glass plate 102 such that the metal portion of the housing 101 is prevented from coming into direct contact with the glass plate 102. Rather, the edge area 102c of the glass plate 102 is aligned with the buffer 103 and, if an external impact deforms the housing 101, the edge area 102c of the glass plate 102 directly contacts the buffer 103.

The housing 101 includes a metal portion (211, FIG. 6) and a non-metallic material portion (e.g., a synthetic resin material portion). A portion of the buffer 103 may be formed on the metal portion and the remaining part of the buffer 103 may be formed on the non-metallic material portion. As will be described with reference to FIG. 6, the buffer 103 may be formed in a closed curve on one face of the housing 101, for example, on the face of the housing 101 on which the glass plate 102 is mounted. For example, the buffer 103 may surround the region where the display panel 121 is disposed and/or the region where the adhesive 119 is disposed.

When an impact is applied to the housing 101 due to being dropped or the like, the impact may be concentrated in a certain portion. For example, when a corner portion of the housing 101 first collides with the floor, the impact may be concentrated in the corner portion. The buffer 103 may be formed only in a portion where the impact is concentrated, or may be formed thicker in the portion where the impact is concentrated while being formed to surround the portion where the display panel 121 is disposed.

As illustrated in FIG. 4, the buffer 103 may be partially exposed to the outside at the outside of the edge area 102c of the glass plate 102. When the glass plate 102 and the buffer 103 are disposed as illustrated in FIG. 5, the glass plate 102 and the buffer 103 can be seen from the outside through the edge area of the glass plate 102. For example, the buffer 103 may provide a decorative effect to the appearance of the electronic device 100.

The housing 101 may include a seating groove 131 (FIGS. 4 and 5) formed to correspond to at least a portion of the edge area 102c of the glass plate 102. For example, the seating groove 131 may be formed in at least the metal portion of the housing 101 in a region corresponding to the edge area 102c of the glass plate 102. The buffer 103 may be formed at least partially in the seating groove 131.

In order to secure sufficient coupling force and/or bonding force between the housing 101 (and/or the metal portion of the housing 101) and the buffer 103, a binding groove is formed in the seating groove 131. As shown in FIG. 5, the binding groove includes, for example, a V-shaped groove 133a formed in and/or recessed from the inner wall of the seating groove 131 and a screw hole 133b formed in and/or recessed from the bottom of the seating groove 131. The buffer 103 may be formed of a synthetic resin, such as polycarbonate, and may be formed through an insert molding method in which the metal portion of the housing 101 is placed in a mold and a molten resin is injected into the mold.

In the insert injection process, the binding force between the metal portion of the housing 101 and the buffer 103 may be weak. An electronic device (e.g., the electronic device 100 of FIG. 2) may include at least one binding groove formed in the seating groove 131, so that sufficient binding force and/or bonding force can be secured between the metal portion of the housing 101 and the buffer 103. In the process of forming the buffer 103, a portion of the buffer 103 may be formed to be engaged with the V-shaped groove 133a and/or the screw hole 133b. For example, a portion of the buffer 103 is bound to the V-shaped groove 133a and the screw hole 133b (and/or the screw threads in the screw hole 133b), so that the buffer 103 dovetails with and is firmly coupled to the metallic material portion of the housing 101.

Figure 6:
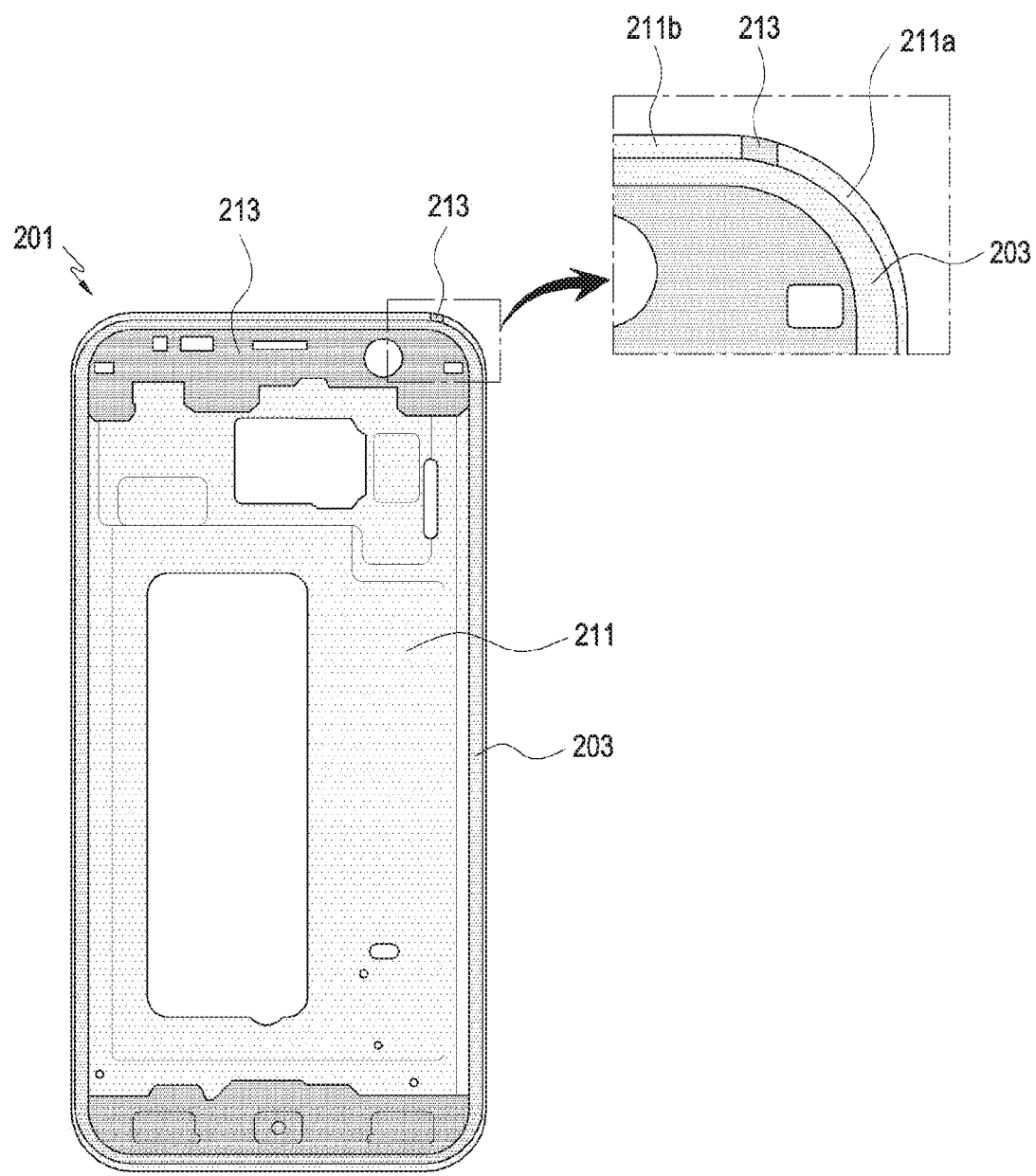
FIG. 6 is a front view of a housing of an electronic device according to an embodiment of the present disclosure.

FIG. 6 is a front view of a housing 201 of an electronic device according to an embodiment.

Referring to FIG. 6, the housing 201 includes a metal portion 211 comprising a metallic material and a synthetic resin material portion 213, and may also include a buffer 203 formed in at least one edge of one face of the housing 201. The housing 201 may include a metal portion 211 formed of a metallic material, and may partially include a synthetic resin material portion, depending on the electronic components disposed within the housing 201. For example, some electronic components (or modules), such as the proximity sensor 24g, the illuminance sensor 24k, the receiver 28b, and the motor 29c in FIG. 1, may be mounted in the housing 201. When it is necessary to form an insulating structure between the electronic components mounted in the housing 201 and other structures, the synthetic resin material portion 213 can be usefully utilized. The synthetic resin material portion 213 may be formed between a first metal portion 211a and a second metal portion 211b of the housing 201. For example, when the first metal portion 211a is utilized as a radiation conductor of the antenna device, the synthetic resin material portion 213 may be interposed between the first metal portion 211a and the second metal portion 211b of the metallic material portion 211 to form an insulating structure.

The synthetic resin material portion 213 may be formed of polycarbonate or the like. When necessary to secure strength in a similar level to the metal portion 211, the synthetic resin material portion 213 may be formed of a synthetic resin to which glass fiber is added. The content of glass fiber in the synthetic resin material portion 213 or the like may be appropriately adjusted in consideration of the kind of the synthetic resin and the strength required for the housing 201. For example, when the synthetic resin material portion 213 is formed of polycarbonate and the metal portion 211 is formed of aluminum, the synthetic resin material portion 213 may include glass fiber in an amount of about 40%.

As shown in FIG. 6, the buffer 203 may be formed in a closed curve on one face of the housing 201. For example, the buffer 203 may extend along an edge of one face of the housing 201, and may be disposed adjacent to an edge area of a glass plate 102 mounted on one face of the housing 201. When the buffer 203 forms the closed curve, the above-described seating groove 131 may be formed in one face of the housing 201 to extend (to be formed) along the edge of the face. The buffer 203 may be formed only in a portion of the closed curve where the impact is concentrated, or may be formed thicker in the portion of the closed curve where the impact is concentrated while being formed in a closed curve.

Figure 7:
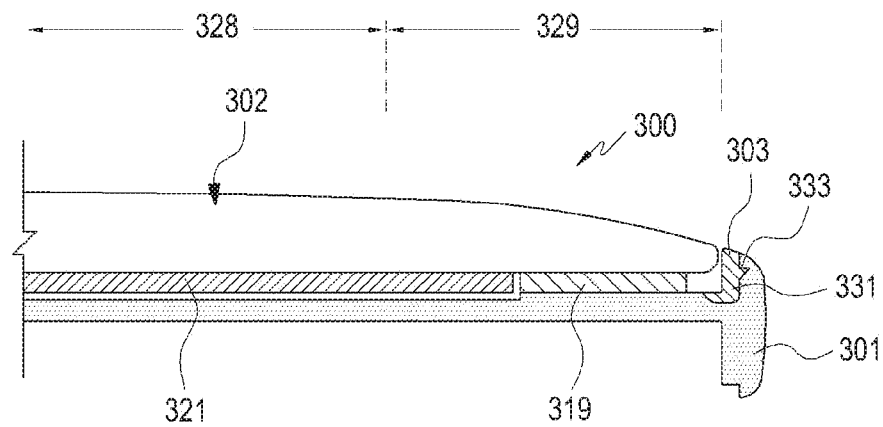
FIG. 7 is a cross-sectional view of an electronic device according to another embodiment of the present disclosure.

FIG. 7 is a cross-sectional view illustrating an electronic device 300 according to an embodiment.

Referring to FIG. 7, the electronic device 300 may include a glass plate 302 having a planar area 328 of a surface thereof and at least a of the window glass plate 302 forming a curved face 329 portion that cures away from the planar area 328. The outer surface of the glass plate 302 forms at least one portion of an outer surface of the electronic device 300. For example, the glass plate 302 may have an edge area formed in a curved shape, and may be coupled to the housing 301 with the display panel 321 interposed adjacent to the glass plate 302. The housing 301 includes a metal portion generally formed of a metallic material, and includes a buffer 303 disposed adjacent to the edge area of the glass plate 302 in a seating groove 331. The buffer 303 includes a binding groove 333 formed to secure within a similarly shaped recess of the housing 301. For example, the buffer 303 may be formed as a portion of the housing 301, and may be disposed at least between the edge area of the glass plate 302 and the metal portion of the housing 301. To affix the glass plate 302 and/or the display panel 321 on the housing 301, an adhesive member 319 may be used to bond a portion of the glass plate 302 onto the housing 301.

Figure 8:
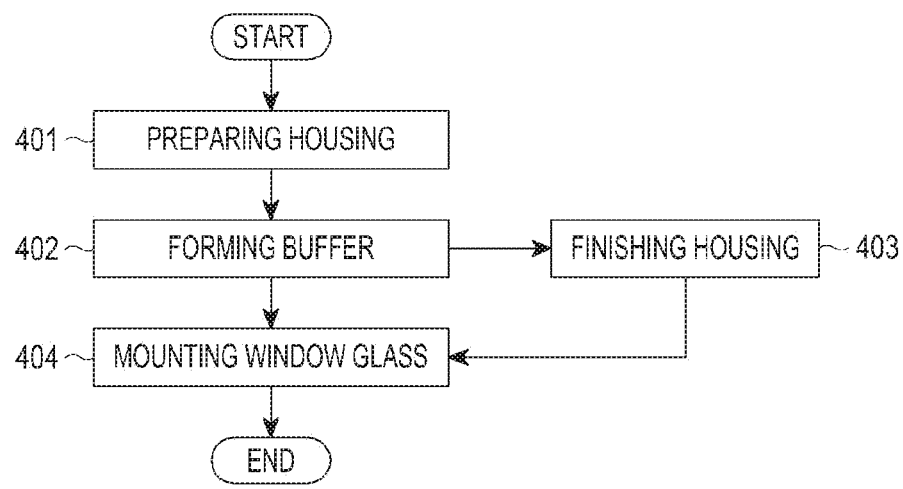
FIG. 8 is a flowchart illustrating a manufacturing method of the electronic device according to another embodiment of the present disclosure.
Figure 9:
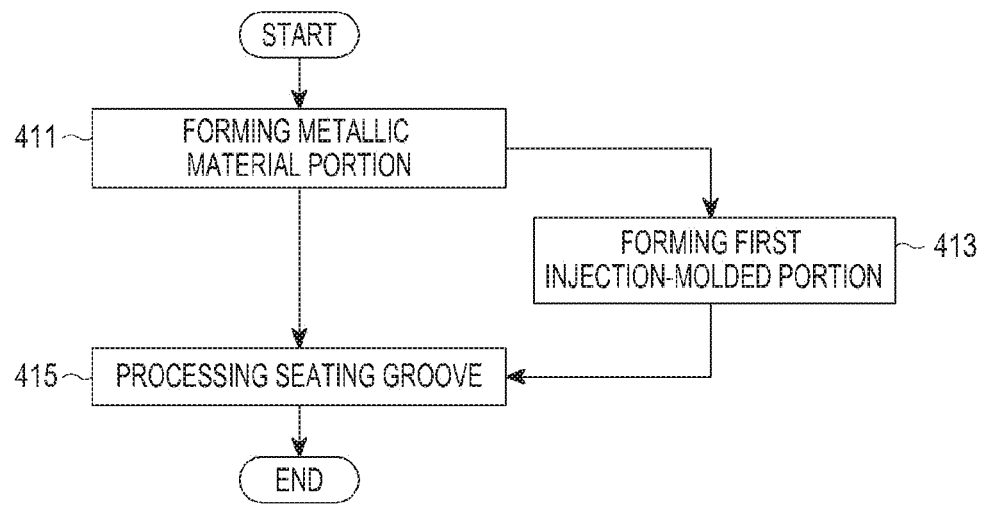
FIG. 9 is a flowchart illustrating an operation of preparing a housing in the manufacturing method of the electronic device according to another embodiment of the present disclosure.
Figure 10:
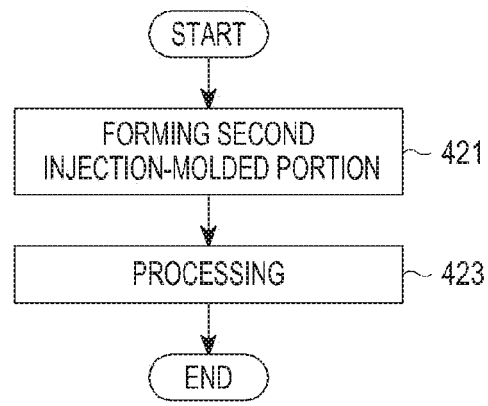
FIG. 10 is a flowchart illustrating an operation of forming a buffer in the manufacturing method of the electronic device according to another embodiment of the present disclosure.

FIG. 8 is a flowchart illustrating a manufacturing method of the electronic device according to an embodiment. FIG. 9 is a flowchart illustrating an operation of preparing a housing in the manufacturing method of the electronic device according to an embodiment. FIG. 10 is a flowchart illustrating an operation of forming a buffer in the manufacturing method of the electronic device according to an embodiment.

Figure 11:
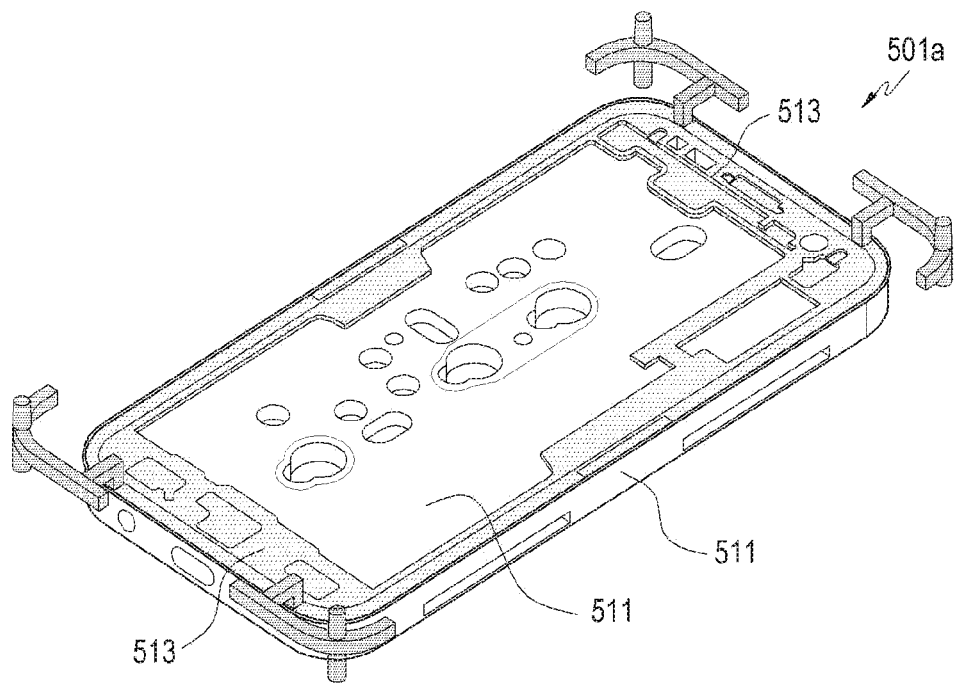
FIGS. 11 and 12 illustrate a state in which a first injection-molded portion is formed in the housing in the manufacturing method of the electronic device according to an embodiment of the present disclosure.
Figure 12:
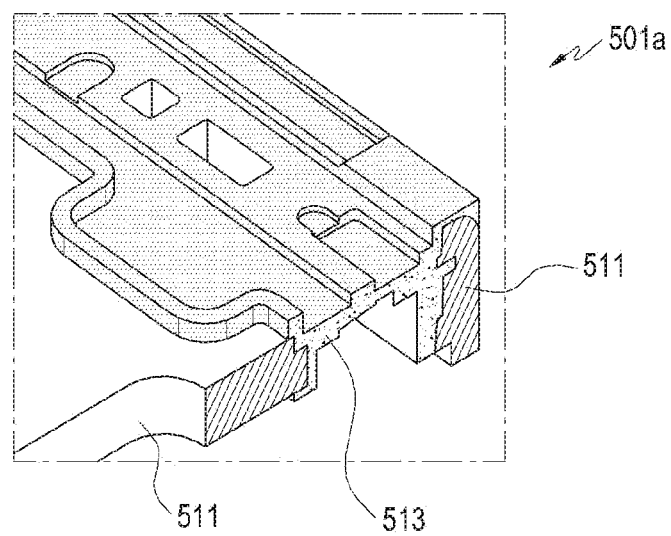
Figure 13:
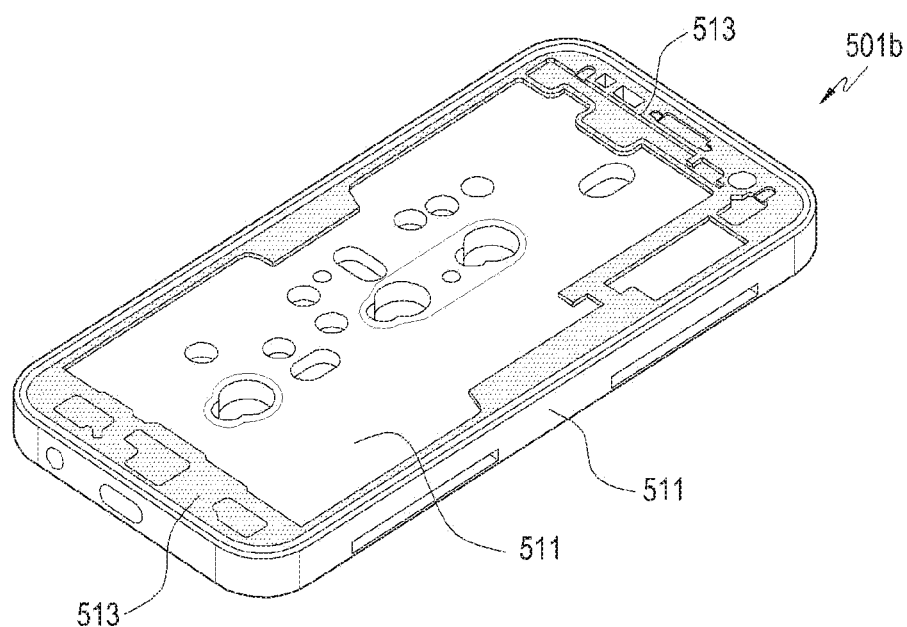
FIGS. 13 and 14 illustrate a state in which the housing is processed, in which the first injection-molded portion is formed in the manufacturing method of the electronic device according to an embodiment of the present disclosure.
Figure 14:
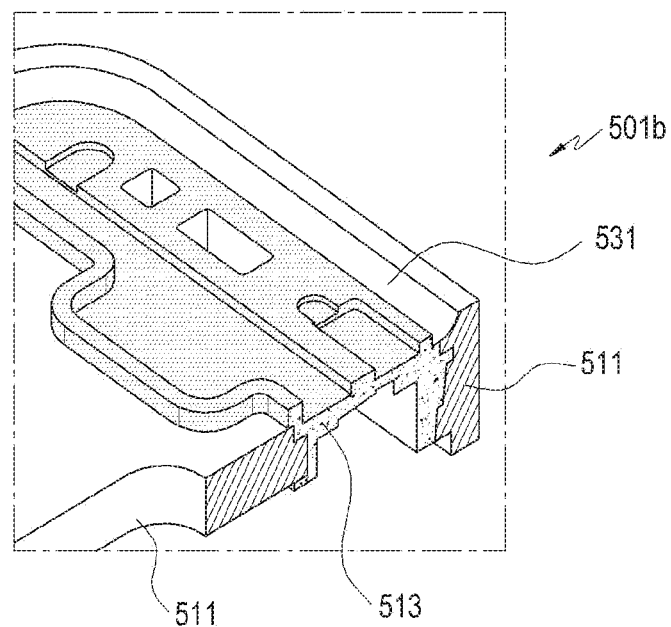
Figure 15:
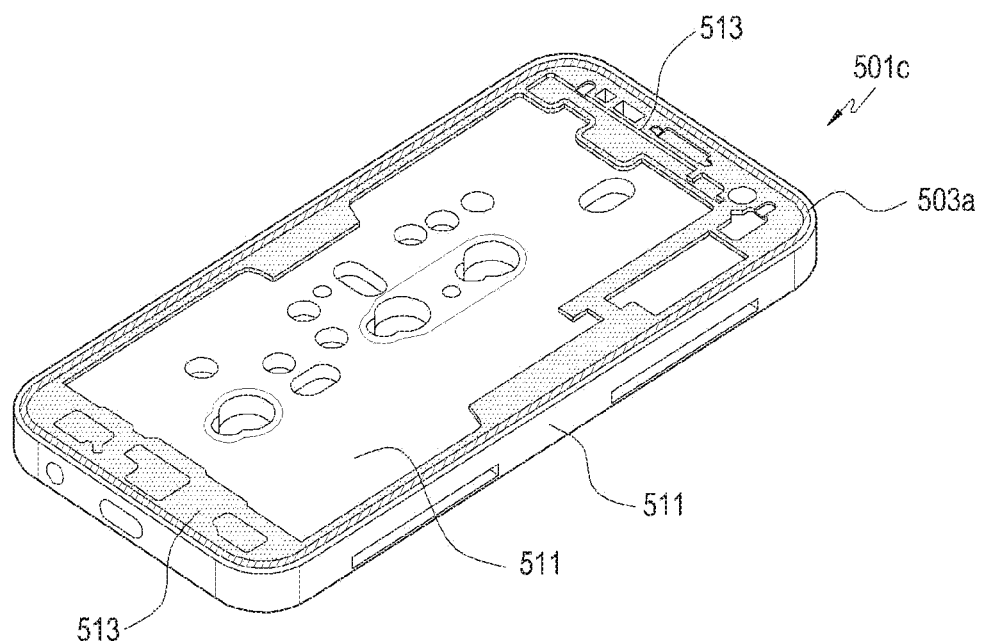
FIGS. 15 and 16 illustrate a state in which a second injection-molded portion is formed in the housing in the manufacturing method of the electronic device according to an embodiment of the present disclosure.
Figure 16:
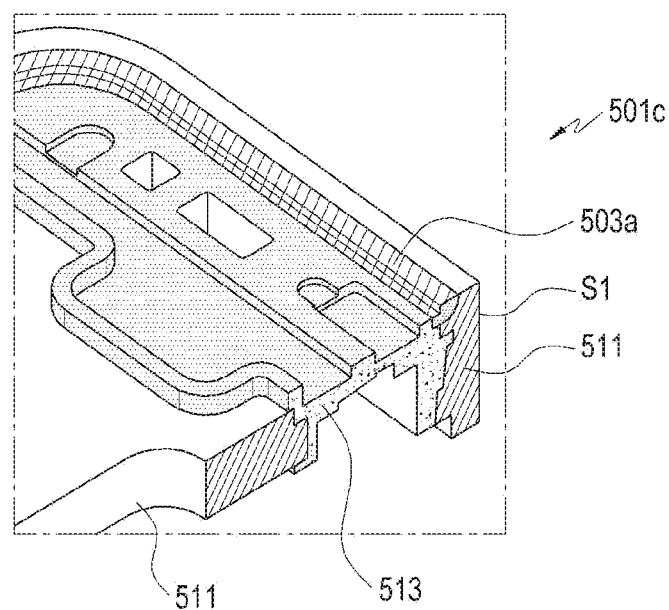
Figure 17:
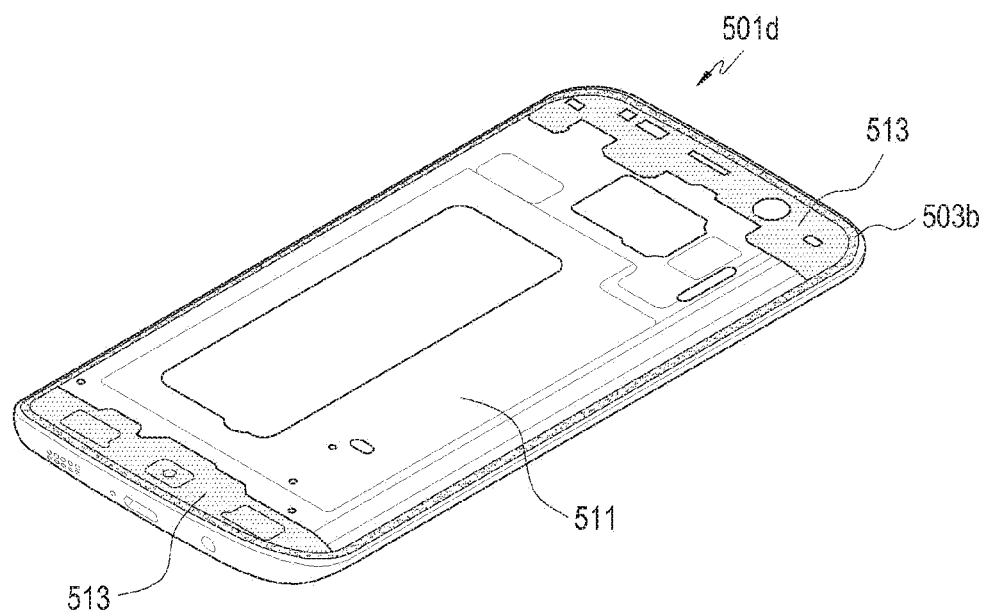
FIGS. 17 and 18 illustrate a state in which a buffer is completed in the manufacturing method of the electronic device according to an embodiment of the present disclosure.
Figure 18:
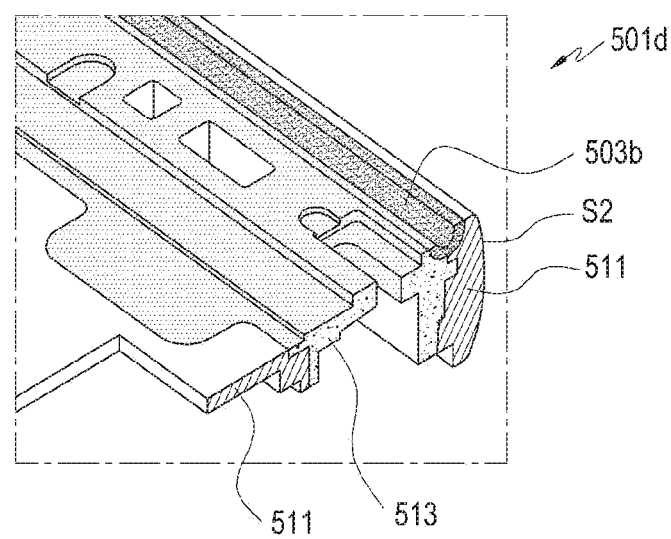

FIGS. 11 and 12 illustrate a state in which a first injection-molded portion is formed in the housing in the manufacturing method of the electronic device according to an embodiment. FIGS. 13 and 14 illustrate a state in which the housing is processed in which the first injection-molded portion is formed in the manufacturing method of the electronic device according to an embodiment. FIGS. 15 and 16 illustrate a state in which a second injection-molded portion is formed in the housing in the manufacturing method of the electronic device according to an embodiment. FIGS. 17 and 18 illustrate a state in which a buffer is completed in the manufacturing method of the electronic device according to an embodiment.

Referring to FIG. 8, a manufacturing method of an electronic device 100 includes, in step 401, preparing a housing, which is at least partially formed of a metallic material. In step 402 a buffer 203 is formed on one face of the prepared housing, and in step 404 a glass plate 102 is mounted on one face of the housing, which is formed with the buffer. When the glass plate is mounted on the housing, a buffer may be disposed at least between the metallic material portion of the housing and the edge area of the glass plate. For example, the buffer may be disposed adjacent to the edge area of the glass plate while being disposed at least in the metal portion of the housing.

Referring to FIG. 9, preparing the housing includes forming, in step 411, the metallic material portion and processing a seating groove in step 415. When necessary to partially isolate the metallic material portion of the housing and/or a portion between the housing to be formed and an electronic component, preparing the housing further includes step 413 that is performed after step 411 of forming a first injection-molded portion before processing the seating groove of step 415.

The step 411 of forming the metallic material portion is an operation for forming the metallic material portion of the housing to be manufactured, and may be performed through a die-casting process. The metallic material portion of the housing to be manufactured may be formed of, for example, aluminum. In some embodiments, the forming of the metallic material portion may include cutting a flat aluminum plate having a predetermined thickness.

The step 413 of forming the first injection-molded portion may be performed when it is necessary to form an insulating portion in the housing to be manufactured. The step 413 of forming the first injection-molded portion may be performed through an insert injection process in which a molten resin is injected while the formed metallic material portion is disposed in the mold. The molten resin injected into the mold in the step 413 of forming the first injection-molded portion may be generally polycarbonate, and may include glass fiber in an amount of about 40%.

A housing 501a (hereinafter, "primarily molded housing 501a"), which is formed with a first injection-molded portion, is illustrated in FIGS. 11 and 12. As shown in FIGS. 11 and 12, a first injection-molded portion 513 may be formed to partially enclose an area between a portion of a metallic material portion 511 and/or another portion thereof.

The processing of the seating groove in step 415 of FIG. 9 is an operation for processing the primarily molded housing 501a, and may remove, for example, an unnecessary portion of the first injection-molded portion 513 (e.g., a molded portion corresponding to a gate or the like for injecting a molten resin), or may form a seating groove in one face of the primarily molded housing 501a. The operation for forming the seating groove may be performed, for example, through a cutting process using a computer controlled lathe or the like, and a seating groove may be formed in an edge area of one face of the primarily molded housing 501a. A housing 501b (hereinafter, "primarily processed housing 501b"), which is formed with a seating groove, is illustrated in FIGS. 13 and 14. Referring to FIGS. 13 and 14, a seating groove 531 is formed along the edge area on one face of the primarily processed housing 501b to form, for example, a closed curve. Processing the seating groove 531 includes removing a portion of the first injection-molded portion 513. A binding groove (e.g., the V-shaped groove 133a or the screw hole 133b in FIG. 5) may be formed in the inner wall and/or the bottom of the seating groove 531 when the seating groove 531 is formed in step 415 of FIG. 9.

Further referring to FIGS. 8 and 10, forming the buffer in step 402 may include forming the second injection-molded portion of step 421 of FIG. 10 and the processing step 423 of the second injection-molded portion. Forming the second injection-molded portion may form the second injection-molded portion by injecting a molten resin (e.g., polycarbonate) in a state in which the primarily processed housing 501b (FIG. 14) is seated in the mold. For example, the second injection-molded portion may be formed in the seating groove 531 in the primarily processed housing 501b. A housing 501c (hereinafter, "secondarily molded housing 501c"), which is formed with a secondarily injection-molded portion, is illustrated in FIGS. 15 and 16. Referring to FIGS. 15 and 16, when the molten resin is injected into the mold, a second injection-molded portion 503a is filled and hardened in the seating groove 531. The molten resin filled in the seating groove 531 may include polycarbonate and may not contain glass fiber, so that the resin filled in the seating groove 531 may have a lower strength (e.g., hardness) than the first injection-molded portion 513. According to some embodiments, when forming the second injection-molded portion 503a, some of the molten resin may be injected into the above-described binding groove (e.g., the V-shaped groove 133a and the screw hole 133b in FIG. 5). For example, the second injection-molded part 503a may be partially engaged with the above-described binding groove while being molded.

The processing operation 423 partially processes and removes the second injection-molded portion 503a so that the buffer can be completed in a shape corresponding to the edge area of the glass plate 102. The buffer may be formed, for example, by partially removing the second injection-molded portion 503a through a cutting process using a computer numerically-controlled lathe. For example, the buffer may be a portion of the second injection-molded portion 503a. A housing 501d (hereinafter, "secondarily processed housing 501d") in which the buffer is completed is illustrated in FIGS. 17 and 18. Referring to FIGS. 17 and 18, the buffer 503b may be formed on the metal portion 511 of the secondarily processed housing 501d and may be partially formed on the first injection-molded portion 513 (e.g., the synthetic resin material portion 213 in FIG. 6). The buffer 503b may be formed along the edge area of one face of the secondarily processed housing 501d, and may have a closed curve shape. The buffer 503b may be formed of a synthetic, non-conductive resin material having a flexibility greater than a flexibility of the metal portion 511, and a stiffness lower than a stiffness of the metal portion 511. The buffer 503b may be formed with a thickness that varies along the closed curve, with the buffer 503b being thicker at one or more corners of the portable communications device, to absorb an external impact that deforms the housing and causes an edge area 102c of the glass plate to directly contact the buffer 103/503b.

The metal portion 511 of the secondarily molded housing 501c is also partially removed in the processing operation of step 423 of FIG. 10 such that the housing 201 can be completed. For example, the flat outer wall S1 of the secondarily molded housing 501c illustrated in FIG. 16 has a curved shape like the outer wall S2 of the secondarily processed housing 501d illustrated in FIG. 18.

As described above, the processing operation of step 423 of FIG. 10 may complete the buffer 503b, and complete the shape of the housing 201 (FIG. 6). The process of completing the buffer 503b and the process of partially removing the metal portion of the secondarily molded housing 501c are performed in separate operations. For example, the operation of processing the buffer 503b made of a synthetic resin material and the metal portion 511 of the secondarily molded housing 501c may be performed independently.

Referring to FIG. 8, the operation for mounting the glass plate in step 404 couples a glass plate 102 to one face of the secondarily processed housing 501d, in which the glass plate may be coupled to the secondarily processed housing 501*d* through an adhesive such as double-sided tape.

The manufacturing method further includes a finishing process (step 403 of FIG. 8) performed on the secondarily processed housing 501*d* of FIG. 18. The finishing process of step 403 may include, for example, a surface treatment for providing various tactile sensations on the face which is touched by the user, a painting or coloring treatment and a discoloration/corrosion prevention treatment for a portion exposed to the external environment, etc. When the manufacturing method includes the operation for performing the finishing process of step 403, the glass plate will be coupled to the housing subjected to the finishing process.

As described above, according to an embodiment, an electronic device is provided that includes a housing including a metal portion comprising a metallic material; a buffer disposed on at least one portion of the metal portion of the housing; and a glass plate forming at least one portion of an outer surface of the portable communication device, with at least one portion of an edge area of the glass plate positioned adjacent to the buffer.

The buffer may be formed on one face of the housing to form a closed curve.

The buffer may be formed of a synthetic resin including polycarbonate.

The housing may include a seating groove formed in one face to correspond to at least a portion of an edge area of the glass plate, and at least a portion of the buffer may be accommodated in the seating groove.

The housing may further include a binding groove formed in the seating groove, and a portion of the buffer may be bound with the binding groove.

The binding groove may include a screw hole.

The buffer may be formed on one face of the housing to form a closed curve.

A portion of the buffer may be exposed outside the edge area of the glass plate, and at least outer face of the edge area of the glass plate may be formed to form a curved face.

The inner face and outer face of the edge area of the glass plate may be formed to form a curved face.

The electronic device may further include a display panel coupled to an inner face of the glass plate, and an adhesive that bonds a portion of the display panel to one face of the housing.

The buffer may be formed in a closed curve that surrounds a region where at least the adhesive is bonded.

A method of manufacturing the above-described electronic device is provided that includes preparing a housing, which is at least partially made of a metallic material, forming a buffer on one face of the prepared housing, and mounting a glass plate on the one face of the housing in which the buffer is formed.

The buffer may be disposed at least on the metallic material portion on the one face of the housing, and may be disposed adjacent to an edge area of the glass plate.

Preparing the housing may include forming the metallic material portion and processing a seating groove in which the buffer is to be disposed, by processing at least the metallic material portion.

Preparing the housing may include forming a first injection-molded portion in the state in which the formed metallic material portion is seated in a mold prior to processing the seating groove.

Processing the seating groove may include forming a binding groove in the formed seating groove.

A portion of the buffer may be configured to be engaged in the binding groove.

Forming the buffer may include forming a secondarily injection-molded portion in the state in which the prepared housing is seated in the mold and completing the buffer by processing the secondarily injection-molded portion to correspond to an edge area of the glass plate.

The method may further include processing the housing in which the buffer is formed prior to mounting the glass plate, with the shape of the buffer being completed to correspond to the edge area of the glass plate.

The method may further include finishing the processed housing after processing the housing in which the buffer is formed.

The finishing operation may include coloring the surface of the processed housing.

According to an embodiment, the electronic device is configured such that a buffer is disposed at least between the metallic material portion of the housing and the edge area of the glass plate. As a result, it is possible to prevent the glass plate from cracking or breaking even when the housing is temporarily or permanently deformed by an external impact. For example, it is possible to prevent application of an impact or a load to the glass plate since the shock applied to the housing or the deformation of the housing is absorbed by the buffer member. Thus, it is possible to provide improved durability, reliability, and the like in the electronic device while enabling an aesthetically pleasing design.

In the foregoing detailed description, specific embodiments of the present disclosure have been described. However, it will be evident to a person ordinarily skilled in the art that various modifications may be made without departing from the scope of the present disclosure.

What is claimed is:

1. A portable communication device comprising:
   a housing including:
      a metal housing member forming a portion of an outer side surface of the portable communication device, the metal housing member including a first metal portion and a second metal portion,
      a seating groove formed along the metal housing member, and
      a resin member including a first portion at least partially formed in the seating groove of the metal housing member and a second portion formed between the first metal portion and the second metal portion; and
   a glass plate forming at least a part of an outer surface of the portable communication device,
   wherein the first portion of the resin member is at least partially exposed to an outside of the portable communication device between the metal housing member and the glass plate and the second portion of the resin member is at least partially exposed to the outside of the portable communication device between the first metal portion and the second metal portion, and
   wherein the second portion of the resin member is configured to form another portion of the outer side surface of the portable communication device between the first metal portion and the second metal portion.

2. The portable communication device of claim 1, wherein a portion of the first portion of the resin member is exposed to the outside of the portable communication device between the glass plate and the second portion of the resin member.

3. The portable communication device of claim 1, wherein the second portion of the resin member extends from the first portion of the resin member.

4. The portable communication device of claim 1, wherein the first portion of the resin member, exposed to the outside of the portable communication device, is formed in a closed curve on one face of the housing.

5. The portable communication device of claim 4, wherein the resin member is formed by insert molding in which a molten resin is injected into the seating groove such that the first portion of the resin member is configured to correspond to a curvature of an outer surface in an edge region of the glass plate and a curvature of an outer surface of the metal housing member.

6. The portable communication device of claim 1, further comprising:
   a binding groove formed from the seating groove into the metal housing member, and
   wherein a portion of the first portion of the resin member is fixedly engaged with the binding groove.

7. The portable communication device of claim 6, wherein the binding groove includes one of a V-shaped groove and a screw hole.

8. The portable communication device of claim 6, wherein the resin member is formed by insert molding in which a molten resin is injected into the binding groove such that the portion of the first portion of the resin member is fixedly engaged with the binding groove.

9. The portable communication device of claim 1, wherein the glass plate includes a planar area and at least one edge area curving away from the planar area.

10. The portable communication device of claim 1, wherein the second portion of the resin member is configured to from an insulating structure between the first metal portion and the second metal portion.

11. The portable communication device of claim 1, further comprising:
   a communication module electrically connected at least one of the first metal portion and a second metal portion, and configured to transmit/receive wireless signals using the at least one of the first metal portion and a second metal portion.

12. A portable communication device comprising:
   a housing including:
      a metal housing member forming a portion of an outer side surface of the portable communication device, the metal housing member including a first metal portion and a second metal portion,
      a seating groove formed along the metal housing member, and
      a resin member including a first portion at least partially formed in the seating groove of the metal housing member and a second portion formed between the first metal portion and the second metal portion, the second portion of the resin member is configured to from an insulating structure between the first metal portion and the second metal portion;
   a glass plate forming at least a part of an outer surface of the portable communication device; and
   a communication module electrically connected at least one of the first metal portion and a second metal portion, and configured to transmit/receive wireless signals using the at least one of the first metal portion and a second metal portion,
   wherein the first portion of the resin member is at least partially exposed to an outside of the portable communication device between the metal housing member and the glass plate and the second portion of the resin member is at least partially exposed to the outside of the portable communication device between the first metal portion and the second metal portion.

13. The portable communication device of claim 12, wherein the resin member is configured to form another portion of an outer side surface of the portable communication device between the first metal portion and the second metal portion.

14. The portable communication device of claim 12, wherein a portion of the first portion of the resin member is exposed to the outside of the portable communication device between the glass plate and the second portion of the resin member.

15. The portable communication device of claim 12, wherein the second portion of the resin member extends from the first portion of the resin member.

16. The portable communication device of claim 12, wherein the first portion of the resin member, exposed to the outside of the portable communication device, is formed in a closed curve on one face of the housing.

17. The portable communication device of claim 16, wherein the resin member is formed by insert molding in which a molten resin is injected into the seating groove such that the first portion of the resin member is configured to correspond to a curvature of an outer surface in an edge region of the glass plate and a curvature of an outer surface of the metal housing member.

18. The portable communication device of claim 12, further comprising:
   a binding groove formed from the seating groove into the metal housing member, and
   wherein a portion of the first portion of the resin member is fixedly engaged with the binding groove.

19. The portable communication device of claim 18, wherein the binding groove includes one of a V-shaped groove and a screw hole.

20. The portable communication device of claim 18, wherein the resin member is formed by insert molding in which a molten resin is injected into the binding groove such that the portion of the first portion of the resin member is fixedly engaged with the binding groove.

* * * * *